Figure 1:
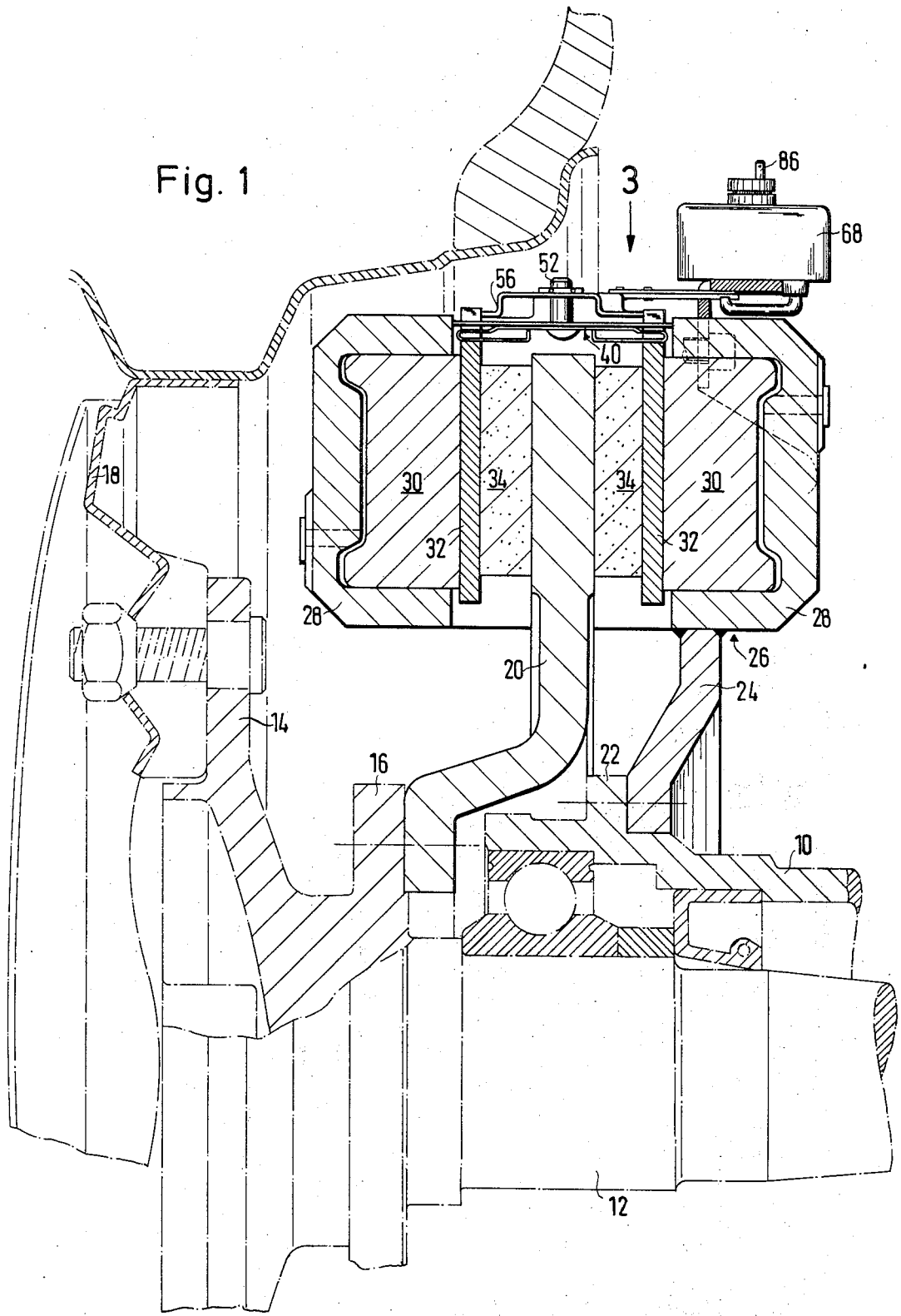

United States Patent [19]
Jorenda et al.

[11] 3,802,257
[45] Apr. 9, 1974

[54] WEAR INDICATOR FOR BRAKE LINING

[75] Inventors: Heinz Jorenda, Burghausen; Wolfgang Willi Scherzer, Bad Neustadt/Saale, both of Germany

[73] Assignee: Preh. Elektro-Feinmechanisch Werke, Jakob Preh Nach, Bad Neustadt/Saale, Germany

[22] Filed: Dec. 7, 1971

[21] Appl. No.: 205,578

[30] Foreign Application Priority Data
Dec. 11, 1970 Germany............ P 20 60 985.2

[52] U.S. Cl. .............................. 73/129, 188/1 A
[51] Int. Cl. .................................... F16d 66/02
[58] Field of Search ........... 73/129, 291; 340/52 A, 340/69; 188/1 A

[56] References Cited
UNITED STATES PATENTS
3,604,865  9/1971  Bricker ............................ 340/52 A
2,087,386  7/1937  Norton ............................. 188/1 A Primary Examiner—Richard C. Queisser
Assistant Examiner—Denis E. Corr
Attorney, Agent, or Firm—Thomas J. Greer, Jr.

[57] ABSTRACT

A device for indicating the wear of the lining of brakes, particularly of disc brakes comprising: a feeler, such as a double-armed lever, adapted to engage a supporting plate for a brake lining; biasing means for keeping said feeler in engagement with said supporting plate; a slide movably engaging an electric resistance, voltage divider or the like; for moving said slide in response to movement of said feeler due to movement of said supporting plate upon wear of said brake lining; an indicator controlled by an electric current flowing through said resistance or the like and being varied by the position of said slide. Said indicator being particularly adapted for use with disc brakes, such as in motor vehicles, with the insertion of the feeler between the two supporting plates of disc brakes.

11 Claims, 8 Drawing Figures

WEAR INDICATOR FOR BRAKE LINING

The invention relates to a device for indicating the wear of brake linings and particularly linings for disc brakes of automotive vehicles.

The basis of the invention is the situation outlined in the following and well known to any expert or driver of motor vehicles.

In using the vehicle, the brake linings thereof are subjected to different degrees of wear, which depend on the respective driving conditions. For the safety of the vehicle it is indispensable to check at certain intervals of time the thickness of the brake linings. This checking or testing is often cumbersome and time consuming. A dangerous lowering of the brake effect may take place when the checking is not done sufficiently often or is not carried out carefully enough. Then the possibility occurs that the brake disc or the supports for the linings are damaged and require extensive and expensive repair. More important is, of course, the danger of accidents due to improper funtioning of the brakes, which might particularly happen when the last shred of brake lining is worn off during an extended drive down a mountain side.

So as to provide for a better supervision of the thickness of the brake linings, it has already been proposed to provide indicators which are so arranged that, when the linings have been worn off to a certain predetermined extend, an optical, electrical or accustic signal is given by which the driver is reminded to replace the linings of his vehicle. These indicating devices have in general a complicated construction and are relatively expensive in their manufacture and installation. For installing these known devices, it is often necessary to drill through the brake linings and the lining supports or backing plates or even to use entirely newly constructed brake lining supports.

It has also been proposed, to provide the brake lining supports with margins which engage the brake disc after a certain amount of wear of the linings and which indicate the wear by a noise.

In German Pat. No. 1,289,693 a noise indicator is proposed, in which the necessary supporting bore directly cooperates in the development of the noise. This supporting bore is closed by a small plate producing the noise and being inserted between the lining support and the lining itself.

The shortcoming of the proposed indicators for the wear of brake linings is that an indication is given only when the lining is completely worn off. For the owner or user of the vehicle it is, however, advantageous and actually a necessity for his safety to recognize in time that the brake linings are about to be renewed.

The object of the invention is the provision of an indicating device which at any time gives an indication of the amount of wear of the lining.

An other object of invention is an indicating device of the specified type, which can be easily manufactured at reasonable costs.

A further object of the invention is the provision of the specified type of brake lining indicator which can be easily installed and does not require expensive changes of the brakes themselves.

A still further object of the invention is an indicator which does not require expensive additional instrumentation but makes use of an instrument available already for other purposes.

The aforesaid and other objects and advantages of invention are achieved by a novel device in which a feeling element is inserted between the supporting or backing plates for the brake lining, the feelers contacting during the braking the backing plates and transferring their movement to a wiper or slide of an electric resistor, the position of the wiper and thus of the feeler and the distance between the backing plates being indicated on an instrument. Instead of a variable resistor there can, of course, be used a variable inductor or capacitor.

The features of the invention as well as the details thereof will become apparent from the following description of embodiments and their illustration in the attached drawings as well as from the claims submitted herewith.

One embodiment of the invention and one modification of a detail thereof are described in the following in connection with the accompanying drawings.

Figure 2:
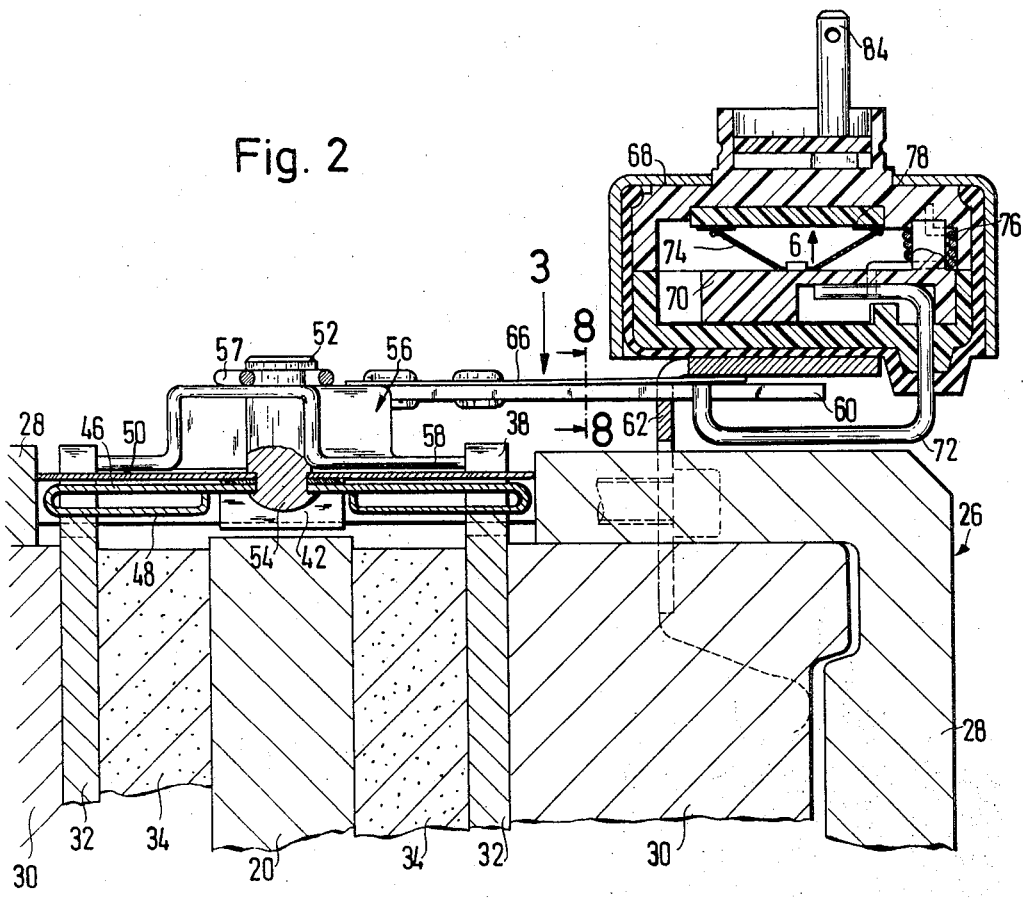
Figure 8:
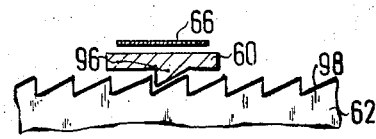
Figure 3:
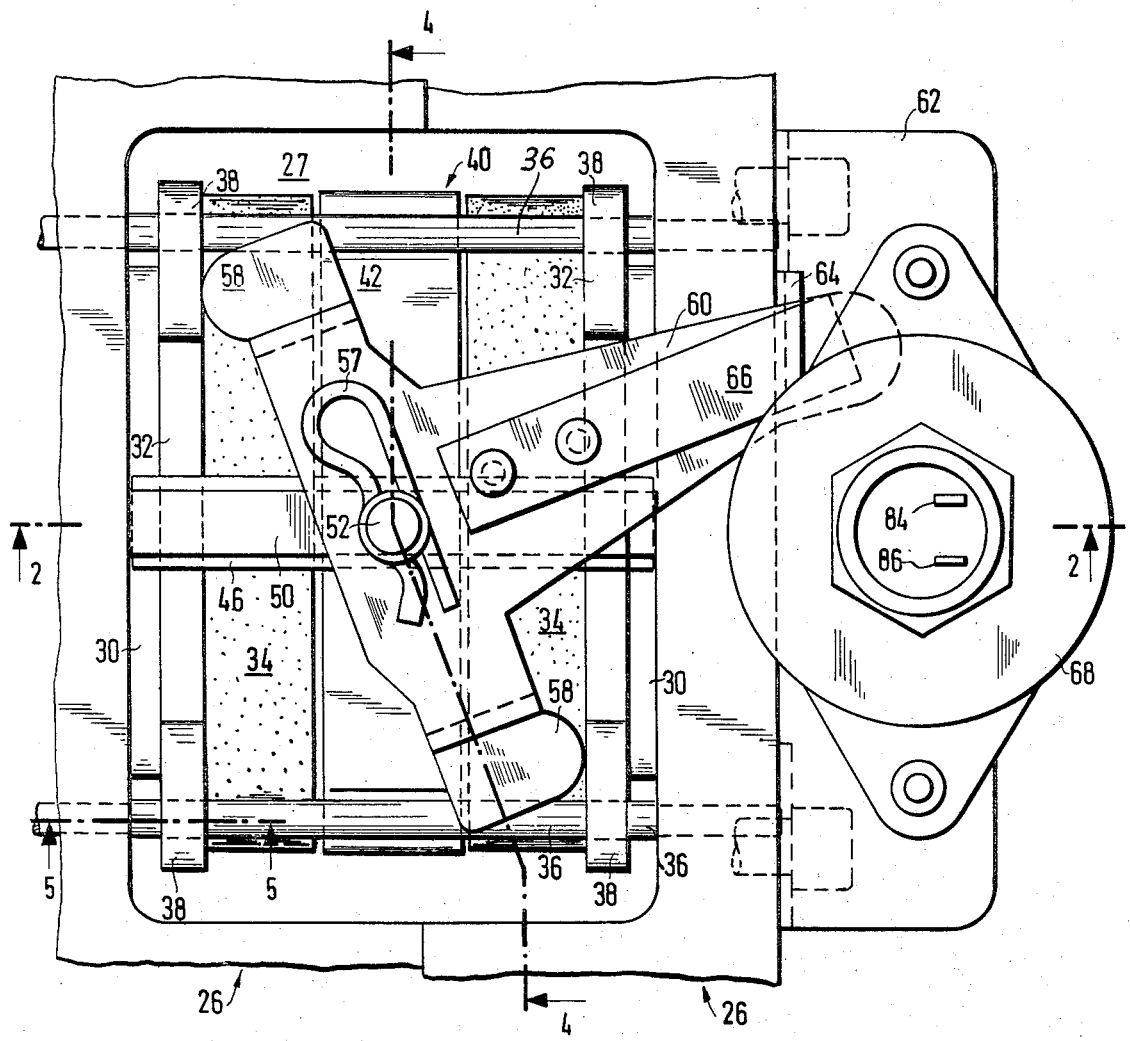
Figure 4:
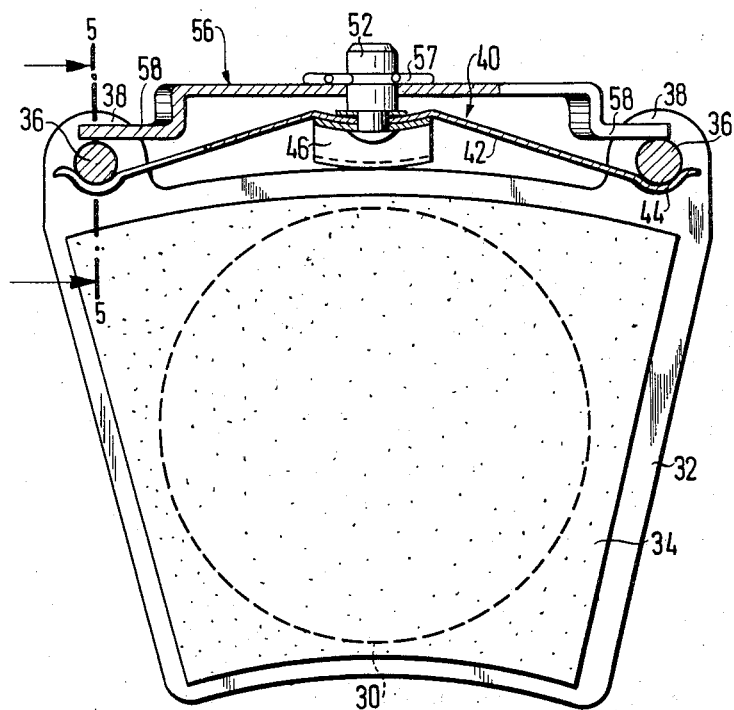
Figure 5:
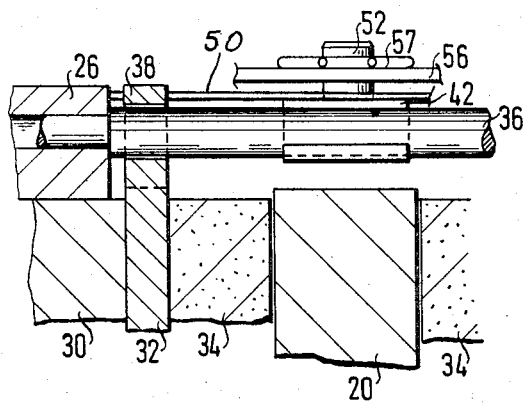
Figure 6:
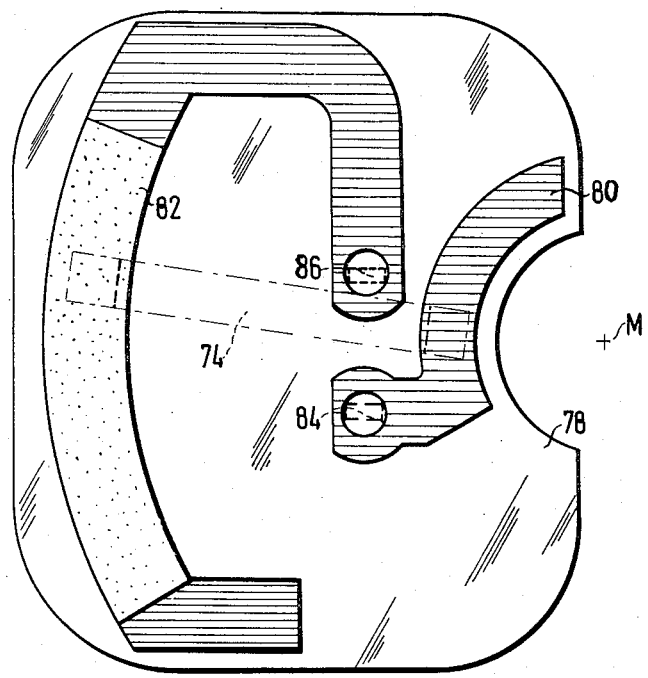
Figure 7:
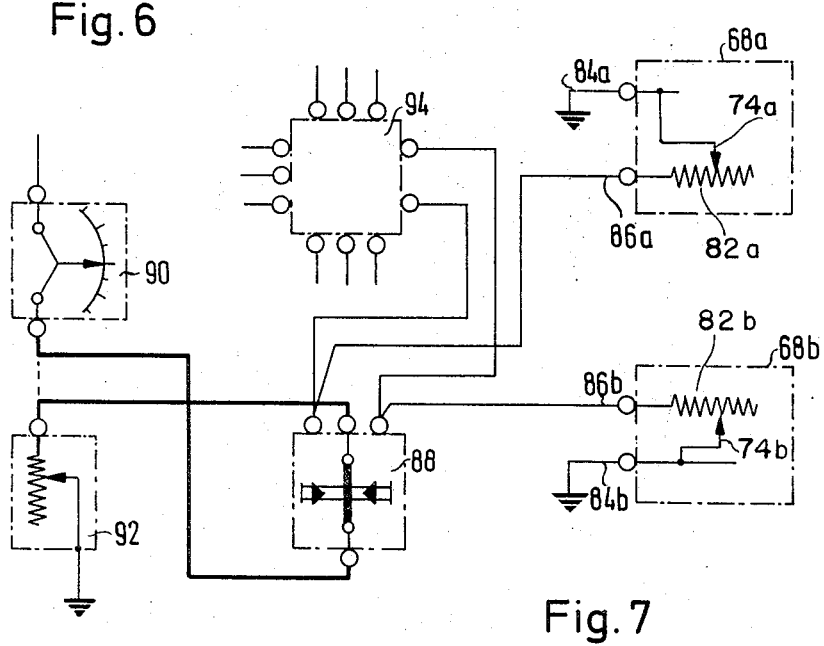

In the drawings is:

FIG. 1 fragmentary axial section through an axle, a wheel, and a disc brake;

FIG. 2 is a section on a larger scale of parts of the brake and of the indicating device;

FIG. 3 a fragmentary plan view of the parts shown in FIGS. 1 and 2 on about the scale of FIG. 2;

FIG. 4 a section and elevational view seen in the direction of the arrows provided at the end of line 4—4 of FIG. 3;

FIG. 5 a fragmentary section and end elevation viewed in the direction of the arrows 5—5 in FIG. 3;

FIG. 6 a bottom view of a slide resistor viewed in the direction of the arrow 6 in FIG. 2 but on a still larger scale;

FIG. 7 a wiring diagram for individually indicating the wear of different brakes of one vehicle and for simultaneously using the same instrument for indicating the fuel in the tank of the vehicle; and FIG. 8 a fragmentary, partly sectional view of a modified detail as seen in the direction of the arrows 8—8 in FIG. 2.

FIG. 1 shows a stationary hollow axle 10 in the interior of which there is rotatably supported an axle shaft 12 provided with a pair of flanges 14,16, flange 14 carrying a vehicle wheel 18 and flange 16 a brake disk 20. Connected to a flange 22 of axle 10 is a support 24 for a brake housing 26. Housing 26 straddles the outer part of brake disc 20 and is provided with two cylinders 28, one each on each side of disc 20. Pistons 30 within the cylinders 28 engage the outer surfaces of supporting, backing or brake plates or brake shoes 32, the other sides of which have attached thereto brake linings 34 adapted to be brought into frictional and braking contact with the opposite surfaces of brake disc 20 by pressure fluid admitted to the cylinders 28. Housing 26 consists of two parts suitable held together by bolts (not shown) and surrounds an opening 27 (FIG. 3).

All this is well known in the art in various forms and thus does not need to be described and illustrated in detail.

The supporting plates 32 are slidingly supported on rods 36 stationarily held by the housing 28. The rods 36 (two only of four are shown) extend through openings in ears 38 formed on the plates 32.

A supporting member 40 for a feeling element, to be described in the following, is illustrated in FIGS. 1 to 5. This element 40 comprises a part 42 extending parallel to brake disc 20 between the plates 32 and engaging by its ends 42 from underneath the rods 36. A part 46 of element 40 extends transversely to part 42 and has reversely bent ends 48 slidingly resting on the opposite plates 32 between the latters' ears 38. A flat strip 50 is provided above part 46 and engages opposite surfaces of housing 26 so as tohold the element 40 in central position relative to said housing. Parts 42,46 and 50 are ridgidly connected with one another by a stud or pin 52 extending by its lower end 54 through openings in the aforesaid parts and being formed as a rivet head 54. The part 52 serves as a pivot stud for a feeler element 56 held in position on stud 52 by a hair spring 57.

The ends of feeler element 56 engage the plates 32 in the region of the ears 38 of the latter and are slidingly supported on the upper side of the guide rods 36. The feeler 56 is a double-armed lever integrally connected with a third arm or cantilever 60 which extends through a slot 64 in a supporting plate 62 attached to brake housing 26. A leaf spring 66 is connected with arm 60, as its outer ends in engagement with a portion of said plate 62 so as to urge arm 60 against one margin of the slot 64 for holding the lever in the lastly attained extreme position, as will be described later on.

Supported by plate 62 is a switch housing 68. Rotatably supported in this housing is a rotor 70 having an arm 72 in engagement with the arm 66 of feeler 56 and carrying a double-armed slide or wiper 74. A spring 76 engages the rotor 70 and the housing 68 and tries to urge the rotor 70 and its arm 72 into engagement with arm 60 of feeler 56 so as to keep the ends 58 of the latter in contact with the supporting plates 32.

An insulating plate 78 is stationarily secured in housing 68 and has applied to its underside a layer conducter 80 and a layer resistor 82. The conducter 80 and the resistor 82 having the form of sectors of a circle about the axis M of rotation of rotor 70 but being spaced from one another in radial direction. The space between conductor 80 and resistor 82 is bridged by wiper or slide 74. Electric current is admitted to the conductor 80 and the resistor 82 by means of terminal posts 84 and 86, respectively.

The posts 84,86 are connected by suitable plug and cable (not shown) or suitable wires to ground and through a switch 88 to an indicating instrument 90 and a source of electrical current as diagrammatically illustrated in FIG. 7 and now to be described.

FIG. 7 diagrammatically illustrates two housings 68a and 68b, respectively, slides 74a,74b and resistors 82a,82b as well as plugs or posts 84a,84b and 86a,86b. A three-way-switch 88 serves for selectively connecting plugs 86a or 86b with the indicating instrument 90 or with a resistor type feeler 92 for gaging the fuel level in a tank. 94 is a diagnosis plug. It is believed not to be necessary to describe the actions, plugs, cables etc., as diagrammatically illustrated in FIG. 7 in greater detail which should not offer any difficulties to every expert.

FIG. 8 shows a fragmentary view, partly in section, for positively holding the feeler 66 in a lastly achieved extreme position. Instead of holding this lever merely by friction in the slot or supporting plate 62, arm 60 of feeler 56 is provided with a tooth 96 which ratches over saw teeth 98 formed on one margin of the slot of supporting plate 62.

The operation of the new device should be practically self-evident from the foregoing description of its details. If the brake linings 34 wear off, the plates 32 will approach one another and the brake disc 20 more and more until the brake lining is worn off alltogether or to a degree that a renewal of the linings is indicated. This approach of plates 32,32 and consequently the amount of wear of the brake linings 34 is shown by the properly calibrated instrument 90 which may be arranged on the instrument panel of an automobile.

Since the wear of the brake lining is a long drawn out, gradual affair extending over a period of say one or two years, of course entirely depending on the amount and type of driving that is being done, it is not necessary to have a continuous indication of the wear condition. For this reason it is entirely satisfactory to use, e.g., the fuel gage for occasionally doubling up as wear indicator. The consumption of the contents of the fuel tank is such that the fuel level needs, as every automobil driver knows, to be indicated practically continuously. The same is not true for the indication of the wear of the brake lining. Hence it means great savings in expense and the space available for the instruments if the fuel gage is only occasionally switched over to indicate the wear of the brake linings.

While one particular embodiment of the invention and a detail-modification thereof have been illustrated and described, it will be clear to every expert that modifications and adaptions are possible or necessary on account of different constructions of brakes and different conditions to be accomodated. All such modifications and adaptions are intended to be covered by the spirit and the language of the following claims. In particular it should be understood that the term "resistor" as used in the claims should also embrace such alternatives, familiar to the expert, as variable inductors, capacitors, voltage dividers etc, and that the term "slide" as used in the claims should also embrace such other familiar movable elements which may be used for varying inductors, capacitors, voltage dividers etc.

What is claimed is:

1. In a device for indicating the wear of brake linings of a brake: a feeler adapted to engage a supporting plate positioned adjacent a brake lining; the position of the plate varying as the thickness of said brake lining, means pivotably supporting said feeler about an axis extending parallel to said plate; resilient means for keeping said feeler in contact with said plate; a slide slidingly engaging an electric resistor; means operatively connecting said slide and said feeler for moving said slide in response to movement of said feeler toward said plate; and an indicator controlled by an electric current flowing through said resistance and slide and having its voltage varied as a function of the position of said slide, the slide being in turn controlled by said feeler.

2. In a device according to claim 1 in which said brake is a disc brake having a brake disc rotably about an axis and a second supporting plate, said plates arranged on opposite sides of said disc for movement toward and away from the latter, said feeler comprising a double-armed lever pivoted at its middle about an axis extending radially to the axis of said brake disc, the ends of said lever being adapted to engage the surfaces of said plates facing toward each other.

3. In a device according to claim 2 in which said lever is provided with means for holding it in position relative to a stationary member of said brake.

4. In a device according to claim 3 in which said lever is provided with a leaf-spring for pressing the lever against an edge of a slot carried by a bracket secured to the brake.

5. In a device according to claim 4 in which said lever is provided with a tooth engaging a saw toothed portion of said slot.

6. In a device according to claim 2 in which said two-armed lever is provided with a third arm extending transversely to said two-armed lever and constituting the means for controlling said slide.

7. In a device according to claim 1 in which said slide is connected with a rotatably supported member, said member having a lever connected therewith, and said lever being engaged by said feeler for adjusting the position of said slide.

8. In a device according to claim 1 in which means are provided for connecting said slide and said resistor with an indicating instrument.

9. In a device according to claim 1 in which switching means are provided for alternatively connecting one of a number of resistors and slides of different brakes of one vehicle with said indicating instrument.

10. In a device according to claim 1 in which switching means are provided for alternatively connecting said indicating instrument with one of several slide and resistor combinations, the one combination being operated by said feeler and the other by another condition.

11. In a device according to claim 10 in which said other condition is the fuel level in a tank.

* * * * *